United States Patent

Nabkel et al.

[11] Patent Number: 6,141,328
[45] Date of Patent: Oct. 31, 2000

[54] METHOD AND SYSTEM FOR TWO-WAY NEGOTIATED CALL HOLD

[75] Inventors: Jafar S. Nabkel; Gregory W. Bruening, both of Boulder, Colo.

[73] Assignees: Qwest Communications International Inc., Denver; MediaOne Group, Inc., Englewood, both of Colo.

[21] Appl. No.: 08/939,376

[22] Filed: Sep. 29, 1997

[51] Int. Cl.[7] .............................. H04Q 11/00; H04M 3/00
[52] U.S. Cl. ...................... 370/259; 370/465; 370/468; 379/266
[58] Field of Search .................................. 370/259, 271, 370/465, 468, 522; 379/209, 265, 266

[56] References Cited

U.S. PATENT DOCUMENTS

| | | | |
|---|---|---|---|
| 3,961,142 | 6/1976 | Caffine ................................... | 179/81 R |
| 4,731,822 | 3/1988 | Berry, III et al. ...................... | 379/204 |
| 4,834,551 | 5/1989 | Katz ......................................... | 379/68 |
| 4,899,381 | 2/1990 | Lee .......................................... | 379/393 |
| 5,155,761 | 10/1992 | Hammond ................................ | 379/67 |
| 5,185,782 | 2/1993 | Srinivasan ................................ | 379/67 |
| 5,436,967 | 7/1995 | Hanson .................................... | 379/266 |
| 5,572,587 | 11/1996 | Gaglani .................................... | 379/266 |
| 5,627,884 | 5/1997 | Williams et al. ......................... | 379/88 |
| 5,751,706 | 5/1998 | Land et al. .............................. | 370/352 |
| 5,805,587 | 9/1998 | Norris et al. ............................ | 370/352 |

FOREIGN PATENT DOCUMENTS 3-49349   4/1991   Japan .............................. H04M 3/60

*Primary Examiner*—Joseph L. Felber
*Attorney, Agent, or Firm*—Brooks & Kushman P.C.

[57] ABSTRACT

A communication system and method for a communication network is provided. The communication system and method allow a calling party and a called party to engage in a two-way negotiated call hold. The two-way call hold enables the calling party, placed on hold by a called party, to disconnect the call and be placed in a queue. The calling party is then notified when a selected position in the queue has been reached and the call between the calling party and the called party is then reconnected at the expense of the calling party. The calling party may monitor its position in the queue before the selected position has been reached.

18 Claims, 2 Drawing Sheets

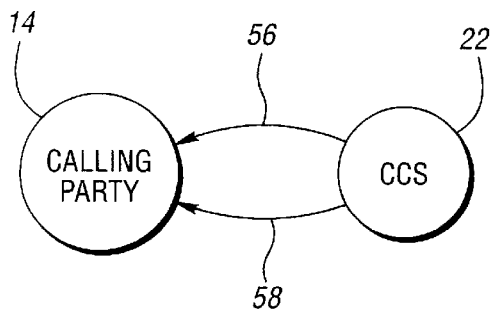
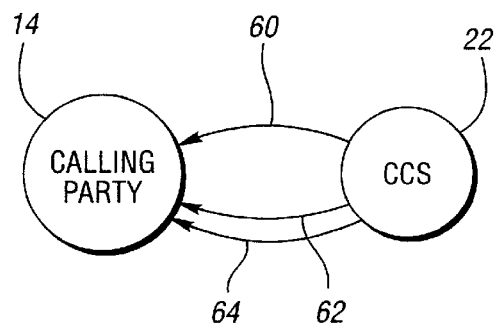
Fig. 5
Fig. 6
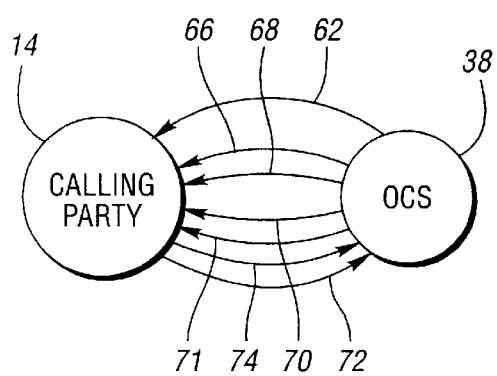
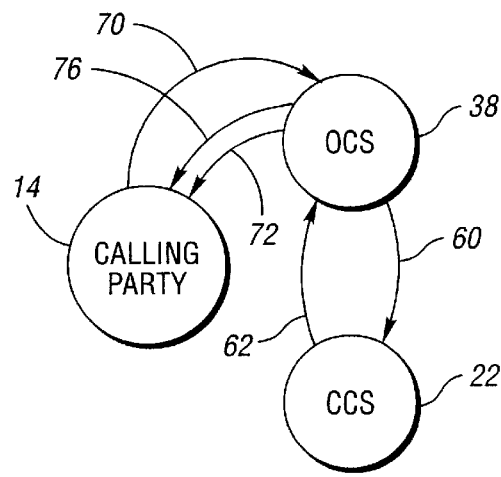
Fig. 7
Fig. 8
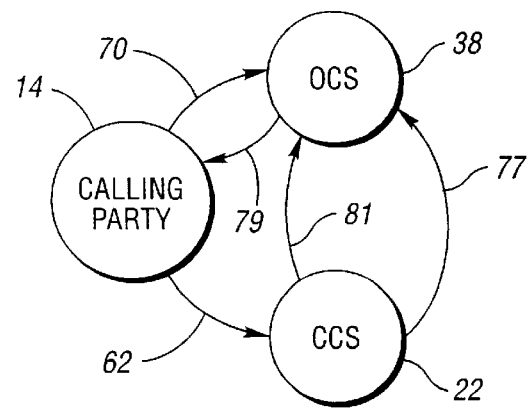
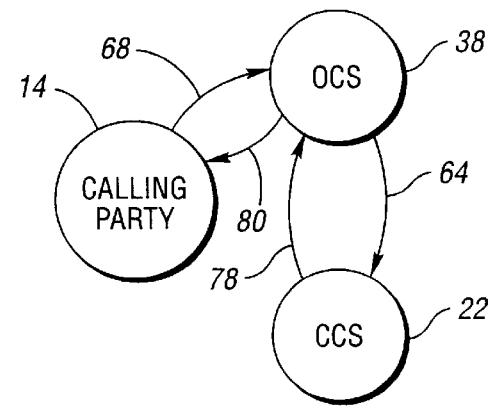
Fig. 9
Fig. 10

METHOD AND SYSTEM FOR TWO-WAY NEGOTIATED CALL HOLD

TECHNICAL FIELD

The present invention relates generally to communication call management and, more particularly, to communication call holding.

BACKGROUND ART

Being placed on hold is an unpleasant and frustrating experience for telephone callers. It is wasted time. The advent of Interactive Voice Response (IVR) units and integrated call management systems by order response centers, businesses, and technical support centers often results in callers being placed on hold. The pressure on these service centers to reduce costs, typically through fewer agents available to answer calls has further exacerbated the problem. Hold times of half an hour to an hour are now fairly common.

Because most service center systems provide no indication of how long a call will be held or indicate how much longer the hold will last, callers often feel held in limbo for an indefinite time. These extended held calls require the caller to stay on the line for the duration of the hold resulting in a large phone bill. As a consequence, significant numbers of callers who are put on hold for more than a brief time period abandon their calls and hang up in resentment and frustration. The result is bad customer relations, wasted effort, and lost business for the service centers.

Furthermore, the hold state is a waste of telephone resources. It unproductively ties up the telephone of the caller as well as the telephone lines, trunks, and switching resources being used to maintain the connection between the caller and the switching system of the service center. If freed, these resources could be used productively for other calls.

To overcome some of these problems a variety of arrangements have been proposed which alert the caller that has been placed on hold to when the hold is removed. The alerting takes the form of an audible or a visual signal generated at the telephone of the caller. The alerting arrangements enable the held caller to do something else instead of having to cradle the telephone handset to his ear listening for the service center to take the call off hold. Alerting arrangements help make the time spent on hold less annoying for the held caller.

U.S. Pat. No. 3,961,142 illustrates a typical alerting device. A primary disadvantage with these alerting devices is that they require all lines from the caller to the service center to remain open. Thus, the caller must stay on the line for the duration of the call which results in significant toll costs. Furthermore, the caller is not allowed to place or receive other calls.

Other proposed arrangements include automatic call-back systems. When an incoming call is not answered by an agent of a service center within a predetermined time period (e.g., three rings), an automatic call-back system answers the call and plays a pre-recorded announcement. The announcement gives the caller the option of either having the call placed in a queue to wait for an agent to pick up, or hanging up and being called back when an agent becomes available. If the caller selects the call-back option, the system either obtains the telephone number of the caller from the telephone network by means of Automatic Number Identification (ANI), or requests the number from the caller. The caller then hangs up. When an agent becomes available, the system places a new call to the caller and connects the call to the available agent at the service center.

U.S. Pat. Nos. 5,436,967, 5,185,782, and 5,155,761 illustrate automatic call-back systems. A primary disadvantage with automatic call-back systems is that they leave callers wondering whether the systems will honor their place in queue and whether the service center will call back. Because the called service center is in control, the caller cannot monitor the status of the held call and cannot initiate a reconnection. Furthermore, the caller is required to divulge his call-back telephone number. Moreover, call-back systems assume that the service center is willing to pay for the call-back. Typically, service centers, especially those providing technical product support involving long detailed calls to solve customer problems, are not willing to pay for calls back to the caller. Quite to the contrary, they expect callers to pay for the call and to wait on hold for indefinitely long periods of time.

SUMMARY OF THE INVENTION

Accordingly, it is an object of the present invention to provide a communication system and method in which a calling party and a called party can engage in a two-way call hold.

It is another object of the present invention to provide a communication system and method in which a calling party, placed on hold by a called party, and the call is disconnected, can then reconnect the call when the hold is removed.

It is a further object of the present invention to provide a communication system and method in which a calling party, placed on hold by a called party, can be put in a queue, have the call disconnected, and then be notified when a selected position in the queue has been reached to reconnect the call to the calling party.

It is still another object of the present invention to provide a communication system and method having an Originating Communication System (OCS) and a Called Communication System (CCS) for negotiating a two-way call hold between a calling party and a called party.

It is still a further object of the present invention to provide a communication system and method in which a calling party can monitor the status of a two-way call hold between the calling party and a called party.

It is still yet another object of the present invention to provide a communication system and method having an OCS which can facilitate multiple two-way call holds between a calling party and different called parties.

It is still yet a further object of the present invention to provide a communication system and method in which a calling party can set an automatic custom time-out period for a two-way call hold between the calling party and the called party.

In carrying out the above objects and other objects, the present invention provides a communications system. The communications system preferably includes a communications network for enabling a calling party to make a call to a called party having agents. A Called Communication System (CCS) is associated with the called party. The CCS is operable with the communications network to connect a call from the calling party to an agent of the called party. The CCS is further operable to notify the calling party that the call is placed on hold.

An Originating Communication System (OCS) is operable with the communications network to communicate with the calling party and the CCS. The OCS negotiates on behalf of the calling party with the CCS to put the calling party in a queue for an agent when the calling party is placed on hold so that the call can be disconnected. The calling party is notified when a selected position in the queue has been reached and the call between the calling party and the called party is then reconnected.

Further, in carrying out the above objects and other objects, the present invention provides a communications method. The communications method includes notifying a calling party that a call between the calling party and a called party is to be placed on hold. The calling party is then placed at a determined position in a queue. The called party is then negotiated with as to when to notify the calling party that a selected position in the queue has been reached. The call between the calling party and the called party is then disconnected. The calling party is then notified when the selected position in the queue has been reached. The call between the calling party and the called party is then reconnected. During the time that the calling party is placed in the queue, the calling party may monitor the status of its position in the queue before the selected position has been reached.

The advantages accruing to the present invention are numerous. For calling parties, the present invention enables their calls to be disconnected to avoid toll fees as well as possible usage fees, such as airtime charges, while holding and frees their time on hold to engage in other activities such as making other calls. In addition, calling parties can control the two-way call hold with the called party by initiating the call hold, monitoring the status of the call hold, terminating the call hold, and reconnecting with the called party at any time. For service centers having automated voice response systems, the present invention allows for longer hold times without customer frustration, thereby reducing personnel costs required to handle the incoming call load. Service centers can also hold the calls in their queues and reduce the number of terminating trunk lines. Fewer terminating trunk lines equates to lower costs. The monetary savings costs to service centers likely far exceeds the incremental cost of incorporating the present invention to new (or even existing) telephony systems.

These and other features, aspects, and embodiments of the present invention will become better understood with regard to the following description, appended claims, and accompanying drawings.

BRIEF DESCRIPTION OF THE DRAWINGS

FIG. 5 is a call processing flow diagram illustrating the negotiation of the terms of how long the CCS maintains the position of the calling party in the queue after the calling party has reached a selected position in the queue;

FIG. 6 is a call processing flow diagram illustrating the exchange of notification contact numbers between the OCS and the CCS that they use to signal each other;

FIG. 7 is a call processing flow diagram illustrating confirmation of the two-way negotiated call hold to the calling party and exchange of notification contact numbers between the OCS and the calling party;

FIG. 8 is a call processing flow diagram illustrating the reconnection of the calling party with the CCS after the calling party has reached a selected position in the queue;

FIG. 9 is a call processing flow diagram illustrating the reconnection of the calling party with the CCS before the calling party has reached a selected position in the queue; and FIG. 10 is a call processing flow diagram illustrating the monitoring of the status of the position of the calling party in the queue.

BEST MODES FOR CARRYING OUT THE INVENTION

Figure 1:
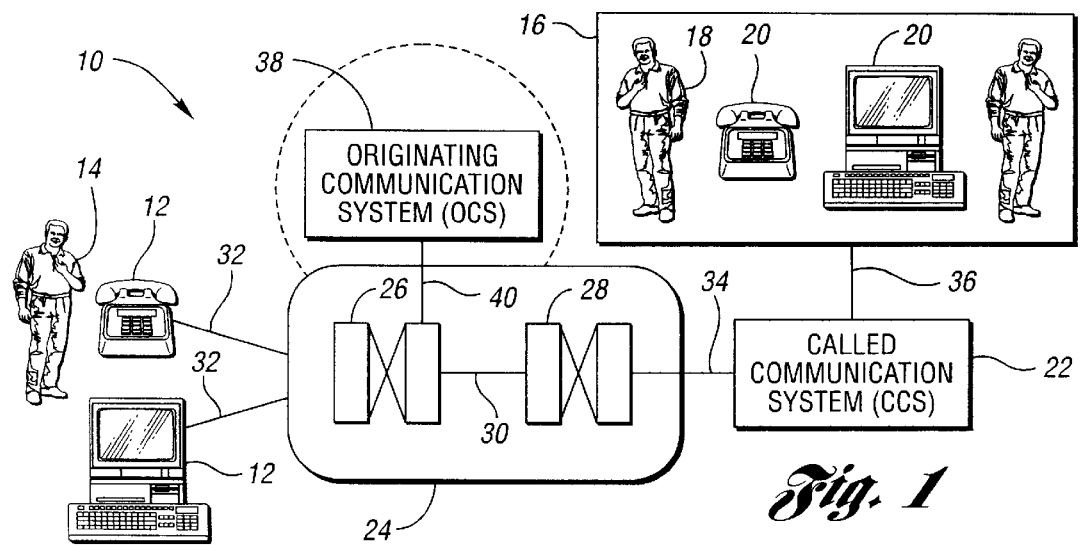
FIG. 1 is a diagram of an illustrative communications system that incorporates an illustrative embodiment of the present invention.

FIG. 1 shows an illustrative communications system 10 that incorporates an illustrative embodiment of the present invention. System 10 includes a communication device 12 for a calling party 14 to place and receive calls to other parts of system 10 such as a service center 16. Communication device 12 may be a device such as a telephone, a wireless phone, a pager, a computer, an Internet phone, or the like. Service center 16 includes an agent 18 having a terminal 20 for receiving calls. A Called Communication System (CCS) 22 is associated with service center 16. For instance, CCS 22 may include an IVR unit capable of putting held calls in a queue and switching held calls at the top of the queue to available agents.

A communications network 24 and CCS 22 connects calling party 14 and service center 16. Network 24 could be a Public Switched Telephone Network (PSTN), a data-packet-switched network such as the Internet, a private network, a private Intranet, or the like. Network 24 includes a local switching center 26 and a destination switching center 28 connected by a communication connection 30. Switching centers 26 and 28 include voice and/or digital data switches. Of course, CCS 22 and OCS 38 could be connected to the same single switch or directly connected with a dedicated connection without an intermediate switching center. A communications connection 32 connects communication device 12 of calling party 14 to network 24. A communication connection 34 connects CCS 22 to network 24. A communications connection 36 connects service center 16 to CCS 22. Communication connections 30, 32, 34, and 36 can either be wireline or wireless.

As described thus far, a call is handled in system 10 conventionally as follows. Calling party 14 places a call to service center 16 by entering the telephone number or other suitable identifier of the service center on communication device 12. Network 24 then connects the call to CCS 22. Service center 16 includes one or more agents located at one or more multiple distributed locations. Calls to agents at service center 16 can be queued in a variety of mechanisms such as, for example, a first-in-first-out (FIFO) priority or an Automatic Called Distribution (ACD).

CCS 22 then attempts to connect the call to terminal 20 of an available agent 18 at service center 16 via communications connection 36. When CCS 22 determines there are no available agents for this calling party, the CCS puts the call on hold and places the calling party in a queue. Alternately, once a call has been routed to an agent 18 the agent can place the call on hold and CCS 22 then manages the call for that agent. However, in all other respects, the call remains established in system 10. Thus, the call remains on line from calling party 14 to CCS 22 with the calling party incurring any usage fees and occupying the calling party's time.

Figure 2:
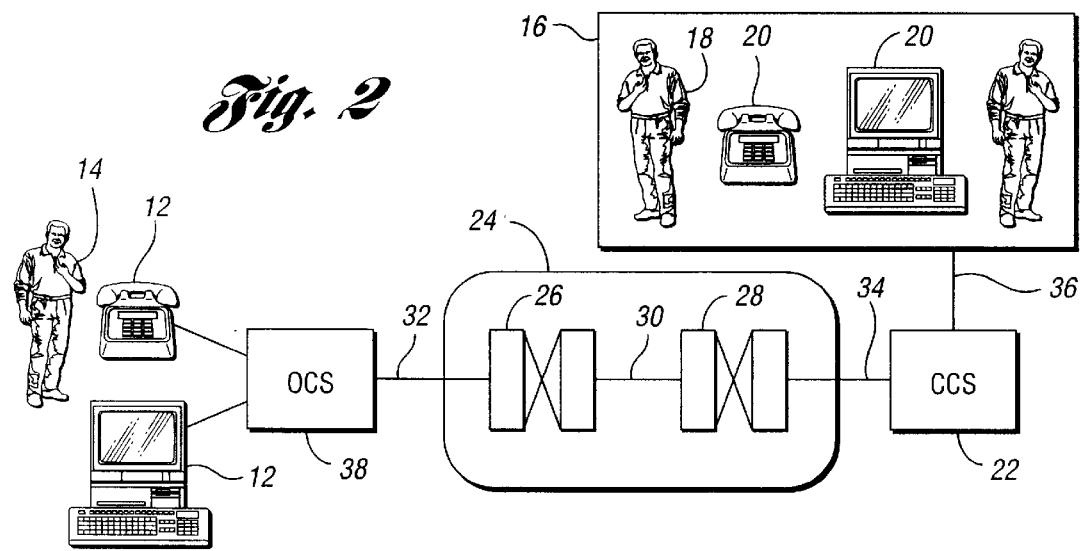
FIG. 2 is a diagram of an illustrative communications system that incorporates another illustrative embodiment of the present invention.

A feature of the present invention is that system 10 includes an Originating Communication System (OCS) 38 operable with CCS 22 to negotiate a two-way call hold between calling party 14 and service center 16. OCS 38 is preferably an adjunct processor to network 24, such as, for example, an Intelligent Network (IN) or Advanced Intelligent Network (AIN) Service Control Point (SCP) in communication with an Intelligent Peripheral (IP). Alternatively, as shown in FIG. 2, OCS 38 is an adjunct processor to customer premises equipment such as communication device 12 and is in direct communication with the communication device and switching center 26. CCS 22 and OCS 38 are general forms of Computer Telephony Integration (CTI).

OCS 38 is connected to network 24 via a communication connection 40 (or communication connection 32 shown in FIG. 2). Communication connection 40, like connections 32, 34, 36, and 38, can either be wireline or wireless. Upon a request from calling party 14 for a two-way call hold between the calling party and service center 16, OCS 38 relays the request to CCS 22 and negotiates with the CCS to allow calling party 14 to disconnect the call when placed on hold, but remain in a queue for the next available agent at service center 16. CCS 22 can confirm the request and, accordingly, both OCS 38 and the CCS know that the call is on hold.

After OCS 38 and CCS 22 negotiate the two-way call hold, the call connection between communication device 12 and the CCS can be torn down. Because the connection is torn down, calling party 14 can also place and receive other calls on communication device 12. Once the negotiated hold has been established, OCS 38 and CCS 22 drop the lines in between. Thus, all calls are torn down while calling party 14 is waiting. As a result, calling party 14 and service center 16 do not incur toll fees during the two-way negotiated call hold, nor do they occupy valuable network trunk resources.

CCS 22 communicates to OCS 38 when calling party 14 has moved to the agreed position of the queue to reestablish the call when agent 18 is about to become available. OCS 38 then notifies calling party 14 of the availability of agent 18 and reconnects the calling party with service center 16 by placing a new call to the service center so that the calling party can speak with the soon to be available agent. Upon reconnection of calling party 14 with service center 16, OCS 38, preferably, disassociates itself from network 24. Calling party 14 incurs the toll fees during reconnection with service center 16.

Figures 3, 4:
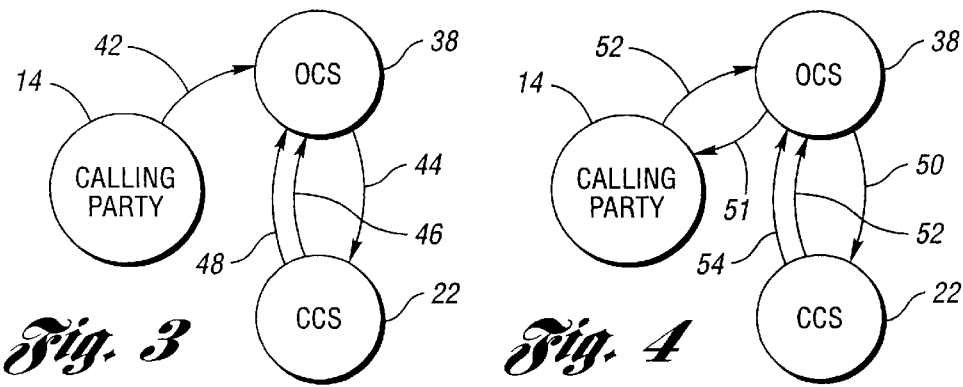
FIG. 3 is a call processing flow diagram illustrating the initiation of a two-way negotiated call hold between a calling party and a service center.
FIG. 4 is a call processing flow diagram illustrating the negotiation of the terms of when the CCS should notify the OCS that the calling party has reached a selected position in the queue.

Referring now to FIGS. 3–10 with continual reference to FIGS. 1 and 2, the present invention will be described in further detail. Initially, calling party 14 makes a call to service center 16 and is placed on hold. As shown in FIG. 3, calling party 14 then initiates a request to OCS 38 for activation of a two-way call hold between the calling party and service center 16. Calling party 14 initiates the request by sending an Initiate Two-Way Hold 42 signal to OCS 38. OCS 38, on behalf of calling party 14, sends a Request Two-Way Hold signal 44 to CCS 22. CCS 22 then determines whether to grant or deny the request. If CCS 22 grants the request, then it responds with a Two-Way Hold Request Granted signal 46. If CCS 22 denies the request, then it responds with a Two-Way Hold Request Denied signal 48. If CCS 22 is not a compatible system, then it simply does not respond and OCS 38 assumes, after a suitable time interval, that the request is denied.

As shown in FIG. 4, after the request is granted, OCS 38 and CCS 22 negotiate the terms of the two-way call hold through a sequence of messages. First, OCS 38 generates and then sends a Call Hold Global Unique Identifier (CHGUI) signal 50 to CCS 22 which is used for the CCS and OCS 38 to identify calling party 14. Preferably, CHGUI signal 50 is an encrypted identifier based on the time of the call and the telephone identifier of calling party 14. Supplying an encrypted identifier preserves calling party telephone number and name anonymity. Of course, CHGUI signal 50 could simply be the telephone number of calling party 14 or any other suitable unique identifier if anonymity is not an issue.

OCS 38 and CCS 22 then negotiate the terms of the two-way call hold. The terms may include agreement as to when CCS 22 should notify OCS 38 that the turn of calling party 14 is pending (e.g., one from the top of the queue of service center 16, two from the top, three from the top, etc.), and agreement as to how long the OCS will attempt to notify the calling party that his turn is pending and how long the CCS will wait and maintain the position of the calling party in the queue.

To determine the terms of the agreement as to when CCS 22 notifies OCS 38 that the turn of calling party 14 is pending, the OCS may prompt (indicated by reference numeral 51) the calling party to select the preferred position in the queue, or estimated time until service center 16 answers, that the calling party wishes to be notified. In response, calling party 14 sends a Position Notification Preference (PNP) signal 52 indicative of the selected position to OCS 38. OCS 38 relays PNP signal 52 to CCS 22. CCS 22 may agree to the selected preference of calling party 14 and confirm this with OCS 38. CCS 22 may also disagree and override the selected preference of calling party 14 with its own position parameter. This parameter for position notification may be fixed (set over a period of time) or dynamic (variable at any time). In any event, CCS 22 notifies OCS 38 of the agreed to or modified parameter with a Position Parameter signal 54.

As shown in FIG. 5, to determine the terms of the agreement as to how long CCS 22 will wait and maintain the position of calling party 14 in the queue, OCS 38 notifies the CCS of a default preference that it will attempt to notify the calling party that an in-progress hold is pending completion. OCS 38 notifies CCS 22 of the default preference by sending a Maximum Reconnect Retry Time Preference (MRRTP) signal 56 to the CCS. CCS 22 can agree to the default preference or can specify a shorter time it is willing to wait once calling party 14 reaches the agreed position in the queue. CCS 22 then notifies OCS 38 of the agreed to or modified reconnect retry time with a Reconnect Time Parameter signal 58. CCS 22 is operable to maintain the position of calling party 14 in the queue once the agreed position is reached for the reconnect retry time. CCS 22 is further operable to promote other calling parties in the queue past calling party 14 for the reconnect retry time.

As shown in FIG. 6, during the negotiation, OCS 38 and CCS 22 also exchange notification contact numbers such as telephone numbers, Internet addresses, abbreviated access star ("*") codes, or other suitable contact numbers that they use to signal and notify each other. OCS 38 provides CCS 22 with an Origination Notification contact number 60 to which the CCS can connect to notify the OCS when calling party 14 has reached the selected position in the queue. CCS 22 provides OCS 38 with a CCS Reconnect contact number 62 that the OCS can connect to reconnect calling party 14 with service center 16. Preferably, CCS 22 associates CHGUI signal 50 along with CCS Reconnect contact number 62 to maintain the position of calling party 14 in the queue. CCS 22 also provides OCS 38 with a Called System Notification contact number 64 to which the OCS can connect with to inquire about the status of the position of calling party 14 in the queue.

As shown in FIG. 7, upon agreement of the terms of the two-way call hold, CCS 22 maintains the calling party in a queue and then tears down the line of the original call (i.e., "hangs-up"). OCS 38 then notifies calling party 14, preferably with a voice generated message 66, of the two-way call hold. OCS 38 notifies calling party 14 of what queue position notification of a pending answer will be provided and the maximum reconnect retry time.

OCS 38 also provides calling party 14 with a Monitor Reconnect contact number 68 for the calling party to call to monitor the status of the held call. OCS 38 further might provide calling party 14 with an OCS Reconnect contact number 70 and CCS Reconnect contact number 62. Calling party 14 uses OCS Reconnect contact number 70 to reconnect with OCS 38. Alternatively, calling party 14 might use CCS Reconnect contact number 62 to directly reconnect with CCS 22 at the current position in the queue. OCS 38 then prompts (indicated by reference numeral 71) calling party 14 to supply the OCS with a Calling Party contact number 72 that the calling party wishes to be notified of the pending hold completion (e.g., the telephone number of the calling party (default), a different mobile number, a paging number, Internet address, etc.).

OCS 38 also allows calling party 14 to set a custom time-out period for the two-way held call by providing the OCS with a Custom Time-out signal 74. After the custom time-out period, OCS 38 notifies CCS 22 to remove calling party 14 from the queue. OCS 38 notifies calling party 14 of any default maximum time-out periods set by CCS 22 on behalf of service center 16 or defaults allowed by OCS 38. For instance, expiration of maximum reconnect retry time or the OCS timeout. Likewise, OCS 38 may have a default time out to prevent infinite hold requests.

After notifying calling party 14 of the two-way call hold and the transfer of the associated information between the calling party and OCS 38, the OCS 38 drops the line to the calling party. Accordingly, calling party 14 may use communications connection 32 to place and receive other calls during the two-way call hold.

As shown in FIG. 8, multiple events can terminate the two-way call hold. First, when CCS 22 determines that the position of calling party 14 in the queue has reached the selected position the CCS calls OCS 38 using Origination Notification contact number 60. Second, when an agent had previously answered a call that he subsequently put on hold and the agent then removes the call from hold, CCS 22 similarly calls OCS 38 using Origination Notification contact number 60. OCS 38 then immediately calls calling party 14 with Calling Party contact number 72. Calling party 14 receives notification from OCS 38 in many possible forms such as a ring on a telephone, a beep on a pager, a call waiting ring, a distinctive ring, voice announcement, visual indicator (including a data message), or the like.

When calling party 14 responds, OCS 38 generates an audible verbal announcement message 76 to the calling party such as "called party ready to answer." After calling party 14 responds using OCS Reconnect contact number 70 to announcement message 76, OCS 38 reconnects the call to CCS 22 by dialing CCS Reconnect contact number 62. OCS 38 then, preferably, disassociates itself out of the loop to optimize the call routing between calling party 14 and service center 16. CCS 22 then completes the call to agent 18 of service center 16 so that the calling party can communicate with the agent. Calling party 14 incurs the cost of the reconnected call unless the original call was toll free. If calling party 14 does not respond to the announcement message within reconnect retry time period then CCS 22 may re-queue the position of calling party 14, promote other callers past the calling party, or handle the queued calling party in a suitable manner such as dropping the calling party from the queue.

As shown in FIG. 9, other events that can terminate the two-way call hold occur when either calling party 14 initiates a reconnection to CCS 22 via OCS 38 by dialing OCS Reconnect contact number 70, when the calling party directly reconnects with the CCS using CCS Reconnect contact number 62, when the CCS has to terminate the hold (e.g., expiration of maximum reconnect retry time), or when the calling party has waited the custom time out period.

CCS 22 could notify OCS 38 using a hold notification information signal 81 if the queue position is suspended until the next business day or with other status information. CCS 22 notifies OCS 38 that the CCS is terminating the call using CCS Hold Termination Notification signal 77. OCS 38 relays to calling party 14 status information such as termination of the call and other information using Hold Status Notification signal 79.

As shown in FIG. 10, calling party 14 can also monitor the status of the held call. To monitor the status, calling party 14 contacts OCS 38 by using Monitor Reconnect contact number 68. OCS 38 then contacts CCS 22 with Called System Notification contact number 64. CCS 22 responds to the inquiry by sending a Status signal 78 to OCS 38. Status signal 78 is indicative of the current position of calling party 14 in the queue and/or the estimated time remaining that the calling party will be placed on hold. OCS 38 translates Status signal 78 into audible speech generated words or suitable textual messages for display on communication device 12 for calling party 14 with an Inquiry Response signal 80. OCS 38 then prompts calling party 14 to hang up and continue the two-way call hold, cancel the two-way call hold, or reconnect with CCS 22.

As shown, the present invention has many attendant advantages including reduced holding costs for calling party 14. All legs of the call processing are billed to calling party 14 unless the original call was a toll free call. However, while calling party 14 pays for all connected time to service center 16, and for reconnection and maintaining hold charges, the calling party does not pay for the time in between when the lines are torn down. Finally, OCS 38 is operable to facilitate more than one two-way call hold to different parties on behalf of calling party 14, and, as shown in FIG. 1, on behalf of multiple calling parties.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

For instance, instead of implementing OCS 38 as an adjunct in network 24, the OCS could be implemented as an adjunct to, or component of, customer premises equipment of calling party 14. Similar changes and modifications could also be implemented in CCS 22, in whole or part, as an adjunct of network 24, or, as illustrated in FIG. 1, as premise equipment of service center 16. CCS 22 and OCS 38 could also be integral parts of network 24.

Furthermore, the signals and parameters described herein represent the primary call processing flow of the present invention. However, other call processing flows may be conducted in accord with the teachings of the present invention.

What is claimed is:

1. A communications system comprising:

a communications network for enabling a calling party to make a call to a called party having agents;

a Called Communications System (CCS) associated with the called party and operable with the communications network to connect a call from the calling party to an agent of the called party and notify the calling party that the call is placed on hold;

an Originating Communication System (OCS) operable with the communications network to communicate with the calling party and the CCS and negotiate on behalf of the calling party with the CCS to put the calling party in a queue for an agent when the calling party is placed on hold so that the call can be disconnected; and wherein the CCS is further operative to notify the OCS when a selected position in the queue has been reached and the OCS is further operative to relay the notification to the calling party and reconnect the calling party to the called party after relaying the notification.

2. A communications system as in claim 1, wherein the CCS is operative to receive a request from the calling party.

3. A communications system comprising:

a communications network for enabling a calling party to make a call to a called party having agents;

a Called Communications System (CCS) associated with the called party and operable with the communications network to connect a call from the calling party to an agent of the called party and notify the calling party that the call is placed on hold;

an Originating Communication System (OCS) operable with the communications network to communicate with the calling party and the CCS, wherein the OCS negotiates on behalf of the calling party with the CCS to put the calling party in a queue for an agent when the calling party is placed on hold so that the call can be disconnected; and wherein the OCS is further operable to monitor the status of the calling party in the queue and the calling party is notified when a selected position in the queue has been reached and the OCS then reconnects the call between the calling party and the called party.

4. The system of claim 3, wherein the calling party can request the OCS to determine the status of the calling party in the queue from the CCS.

5. The system of claim 3, wherein the OCS is operable to notify the calling party of its status in the queue.

6. The system of claim 3, wherein the OCS and CCS negotiate to determine how long the CCS keeps the calling party in the queue after the calling party is notified that the selected position in the queue has been reached.

7. The system of claim 3, wherein the CCS is operable to promote other callers in the queue past the calling party after the calling party has been notified that the selected position in the queue has been reached.

8. The system of claim 3, wherein the OCS is operable to reconnect the call between the calling party and the CCS for the called party before the selected position in the queue has been reached.

9. The system of claim 3, wherein:

the OCS is operable with the calling party to allow the calling party to establish a custom time out period for waiting in the queue; and the CCS notifies the OCS when the custom time out period has expired and the OCS relays the notification to the calling party.

10. The system of claim 9, wherein the OCS is operable to reconnect the call between the calling party and the CCS for the called party after the custom time out period has expired.

11. A communications method comprising:

notifying a calling party that a call between the calling party and a called party is to be placed on hold;

placing the calling party at a determined position in a queue;

negotiating with the called party as to when to notify the calling party that a selected position in the queue has been reached;

disconnecting the call between the calling party and the called party;

monitoring the status of the calling party in the queue;

notifying the calling party when the selected position in the queue has been reached; and reconnecting the call from the calling party to the called party.

12. The method of claim 11 further comprising providing the called party with notification preferences of the calling party.

13. The method of claim 11 further comprising keeping the calling party in the queue for a selected time interval after the calling party is notified that the selected position in the queue has been reached.

14. The method of claim 11 further comprising promoting other callers in the queue past the calling party after the calling party has been notified that the selected position in the queue has been reached.

15. The method of claim 11 further comprising reconnecting the call from the calling party to the called party before the selected position in the queue has been reached.

16. The method of claim 11 further comprising:

establishing a custom time out period for waiting in the queue; and notifying the calling party when the custom time out period has expired.

17. The method of claim 16, further comprising reconnecting the call from the calling party to the called party after the custom time out period has expired.

18. The method of claim 11 wherein the call between the calling party and the called party is reconnected at the expense of the calling party.

* * * * *